United States Patent [19] [11] 4,288,412
Chang et al. [45] Sep. 8, 1981

[54] POST TREATMENT METHOD FOR THE RECOVERY OF URANIUM FROM WET-PROCESS PHOSPHORIC ACID

[75] Inventors: Sir-Sea Chang, Taipei; Sheng-Laang Chern, Taoyuan; Gann Ting; Tsai-Shu Kuo, both of Taipei, all of Taiwan

[73] Assignee: Institute of Nuclear Energy Research, Taiwan, Taiwan

[21] Appl. No.: 938,658

[22] Filed: Aug. 31, 1978

[51] Int. Cl.³ ............................................. C01G 43/00
[52] U.S. Cl. ........................................ 423/10; 423/8; 423/321 S
[58] Field of Search ............................... 423/10, 8-9, 423/321 S

[56] References Cited

U.S. PATENT DOCUMENTS

| | | | |
|---|---|---|---|
| T971,006 | 6/1978 | Smith | 423/8 |
| 2,860,031 | 11/1958 | Grinstead | 423/10 |
| 2,882,123 | 4/1959 | Long | 423/10 |
| 3,737,513 | 6/1973 | Wiewiorowski et al. | 423/8 |
| 3,835,214 | 9/1974 | Hurst et al. | 423/20 |
| 4,108,957 | 8/1978 | Michel | 423/18 |

OTHER PUBLICATIONS

Hurst et al., "Recovery of Uranium from Wet Process Phosphoric Acid by Extraction with Octylphenylphosphoric Acid," *Ind. Eng. Chem. Process Des. Develop.*, 13, (#3), pp. 286-291, (1974).
Ford et al., "Chemical Engineering/Deskbook Issue", pp. 49-56, (Oct. 17, 1977).
Perry et al., "Chemical Engineers' Handbook", 5th Ed., pp. 21-11-21-12, McGraw-Hill Book Company, (1973), New York.

*Primary Examiner*—Edward A. Miller
*Attorney, Agent, or Firm*—Oblon, Fisher, Spivak, McClelland & Maier

[57] ABSTRACT

In the process of uranium recovery from wet-process phosphoric acid, post treatment of the raffinate phosphoric acid is very important to prevent damage to the rubber linings of the acid evaporators and to recover the solvent for reuse. A simple and continuous method using an inclined parallel-corrugated-plate separator to remove the organic solvent entrainment from the raffinate phosphoric acid is established herein.

5 Claims, 2 Drawing Figures

SIDE VIEW OF SEPARATOR WITH MOVING PATH OF ORGANIC DROPLET

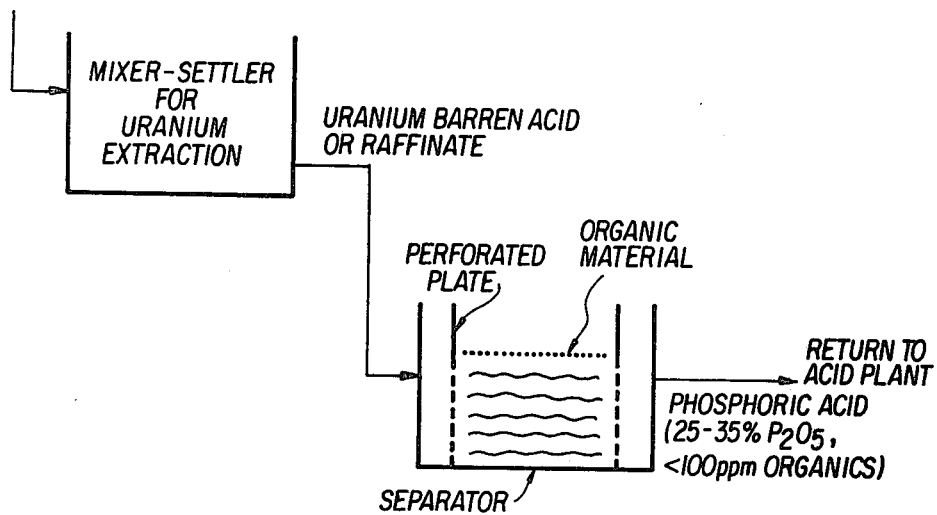
FIG. 1 SIMPLIFIED FLOWSHEET FOR POST TREATMENT
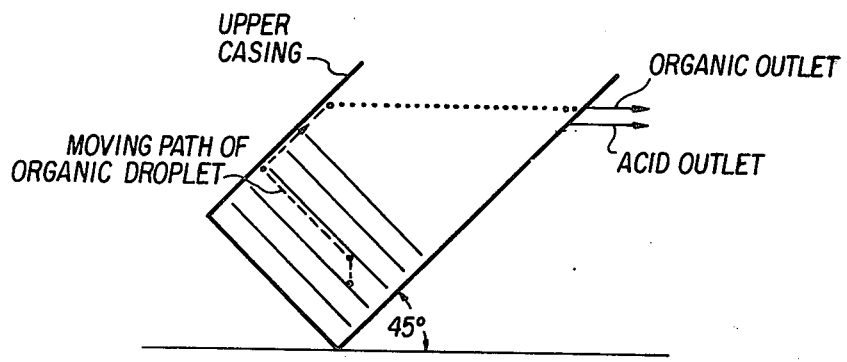
FIG. 2 SIDE VIEW OF SEPARATOR WITH MOVING PATH OF ORGANIC DROPLET

POST TREATMENT METHOD FOR THE RECOVERY OF URANIUM FROM WET-PROCESS PHOSPHORIC ACID

BACKGROUND OF THE INVENTION

In recent years, many researchers make their efforts at uranium recovery from wet-process phosphoric acid and several pilot plants have been successfully demonstrated in the United States. In these processes, uranium is extracted from the phosphoric acid with organic solvents which are organophosphates (D2EHPA-TOPO or OPAP) diluted in kerosene. (See articles in (1) Fred J. Hurst et al., "Recovery of uranium from wet-process phosphoric acid", Ind. Eng. Chem. Process Des. Develop., Vol. 11, No. 1, p. 22, 1972. (2) Fred J. Hurst et al., "Recovery of uranium from wet-process phosphoric acid, extraction with octylphenylphosphoric acid", Ind. Eng. Chem. Process Des. Develop., Vol. 13, No. 3, p. 286, 1974. (3) Fred J. Hurst et al., "Progress and problems of recovering uranium from wet-process phosphoric acid", presented at the 26th Annual Meeting Fertilizer Industry Roundtable, October, 1976). Regardless of how well the uranium solvent extraction system operates, the acid raffinate contains entrained solvent. Most of this entrained organic material must be removed from the uranium-barren acid before it is returned to the acid plant in order to prevent damage to the rubber-lined evaporators and to recover the solvent for reuse. Potential removal methods include hold-up tanks, air flotation units, filtration and packed columns. Unfortunately, the exact means of these methods is still a proprietary or trade secret. On the other hand, these methods usually require large space, pumping device, power supply and expensive equipment or chemicals. The principal object of this invention is to provide an efficient, continuous and simple method for removing and recovering the entrained organic solvent from the uranium-barren acid or raffinate solution so as to reduce the above-mentioned damage and to save the loss of the extractant.

SUMMARY OF THE INVENTION

This invention is to provide a set of separator for efficiently removing the entrained organic solvent from the raffinate acid solution for uranium recovery from wet-process phosphoric acid. The separator is a 45-degree-inclined rectangular tank in which parallel corrugated plates are also inclinedly installed in 45 degrees with equal space between plates. When the raffinate acid solution (25~35% $P_2O_5$) from uranium extraction process flows through the separator, the entrained organic droplets will move upward to the top layer of acid solution before flowing out of the separator. The organic solvent on the top of acid solution is collected through an overflow nozzle for reuse. In the mean time, the uranium-barren acid with less than 100 ppm of organic material returns to the phosphoric acid plant.

DESCRIPTION OF THE INVENTION

Referring to FIG. 1, the raffinate phosphoric acid from the uranium extraction process with entrained organic solvent is continuously guided into the separator which is a 45-degree-inclined rectangular tank. As shown in FIG. 2, the upper casing of the tank is perpendicular to the direction of the 45-degree-inclined parallel-corrugated-plate pack inside the tank.

The raffinate acid flows horizontally and is perpendicular to the cross section of the pack. Entrained organic droplets in the raffinate acid rise upward due to buoyancy until touching the parallel plates and adhering to the lower surface of the plates. Because the velocity of the acid flow is so slow, the organic droplet adhering to the plate surface will not be carried away by the flowing acid. That is, once the droplet adheres to the plate surface, it is separated from the acid. Through collision each other, the organic droplets adhering beneath the plate will become larger and the buoyant force acted on the organic droplet will also become greater. As this buoyant force is greater than the adhering force between the organic droplet and the plate surface, the droplet will slide upward along the inclined corrugated plate to the top edge of the plate as shown in FIG. 2. Leaving the top edge of the plate, the droplet will soon adhere again to the inner surface of the upper casing because the gap between the top edge of the plate and the upper casing is very small. Then the droplet will slide upward along this inclined surface to the top layer of the acid solution immediately because at this time the droplet size is generally larger than the size when the droplet is rising between the parallel plates. In this manner, the upper casing of the tank acts as a secondary inclination plate along which droplets can slide upward. The organic solvent is collected at the top layer where the acid is stagnant and then overflows into a storage tank for reuse. The treated acid which will be returned to the phosphoric acid plant then flows out of the separator containing only very limited quantity of organic solvent entrainment. In the laboratory demonstration, raffinate acid from recovery process of uranium by solvent extraction with D2EHPA-TOPO-kerosene or OPAP-kerosene has been carried out the post treatment at the acid throughput of 6 liters/hr and 100 liters/hr respectively. The experimental results indicate that the organic entrainment content can be reduced from 100~1000 ppm (or $\mu g/ml$) in the feed stream to 10~100 ppm in the effluent stream. The concentration of the organic in the acid stream is determined by gas-chromatographic method. Nowadays, the researchers for the recovery of uranium from wet-process phosphoric acid and the people of the phosphoric acid plant consider that the organic entrainment in the raffinate acid will not be harmful to the rubber-lined evaporators if the organic content is below 100 ppm.

The size of the parallel-corrugated-plate pack inside the separator can be estimated by applying Stokes's law. The casing of the separator is fabricated with FRP or acrylic plate or other plastic material which is resistant to both phosphoric acid and organic solvent. The pack is constructed by PVC corrugated plates. The distance between these plates is in the range of 1.0~5.0 cm. Perforated plates are installed at the feed side and the effluent side of the separator to make a uniform distribution of flow. Both the treated acid stream and the recovered organic solvent stream overflow through nozzles into storage tanks by gravity without any skimming device. The separator is simple maintenance, easy fabrication, efficient operation and low equipment cost. Therefore, this method is very satisfactory to be used in the post treatment of the uranium recovery from wet-process phosphoric acid.

We claim:

1. A method of effectively separating residual organic solvent entrained in the phosphoric acid raffinate obtained from uranium extraction comprising:

passing the raffinate into an inclined tank having parallel lower and upper casings, the tank containing a plurality of plates attached essentially perpendicularly to the lower casing but not touching the upper casing, whereby droplets of said organic solvent separate from the raffinate, flow upward along the lower surface of the plates, continue to flow upward along the inner surface of the upper casing and accumulate as a separate layer on the surface of the raffinate in the tank, the rate of flow of the raffinate into the tank being insufficient to cause said droplets of organic solvent to be carried away in the raffinate flow; and separately withdrawing the layer of organic solvent and the raffinate from the tank.

2. The method of claim 1, wherein said tank is inclined at an angle of 45° to the horizontal.

3. The method of claim 1, wherein said plates possess a corrugated surface.

4. The method of claim 1, wherein said organic solvent is di(2-ethylhexyl) phosphoric acid-trioctylphosphine oxide-kerosene or octylphenyl phosphoric acid-kerosene.

5. The method of claim 1 wherein the raffinate passing into the tank has an organic solvent content of from about 100 to 1000 ppm and the raffinate withdrawn from the tank has an organic solvent content of from about 10 to about 100 ppm.

* * * * *